UNITED STATES PATENT OFFICE.

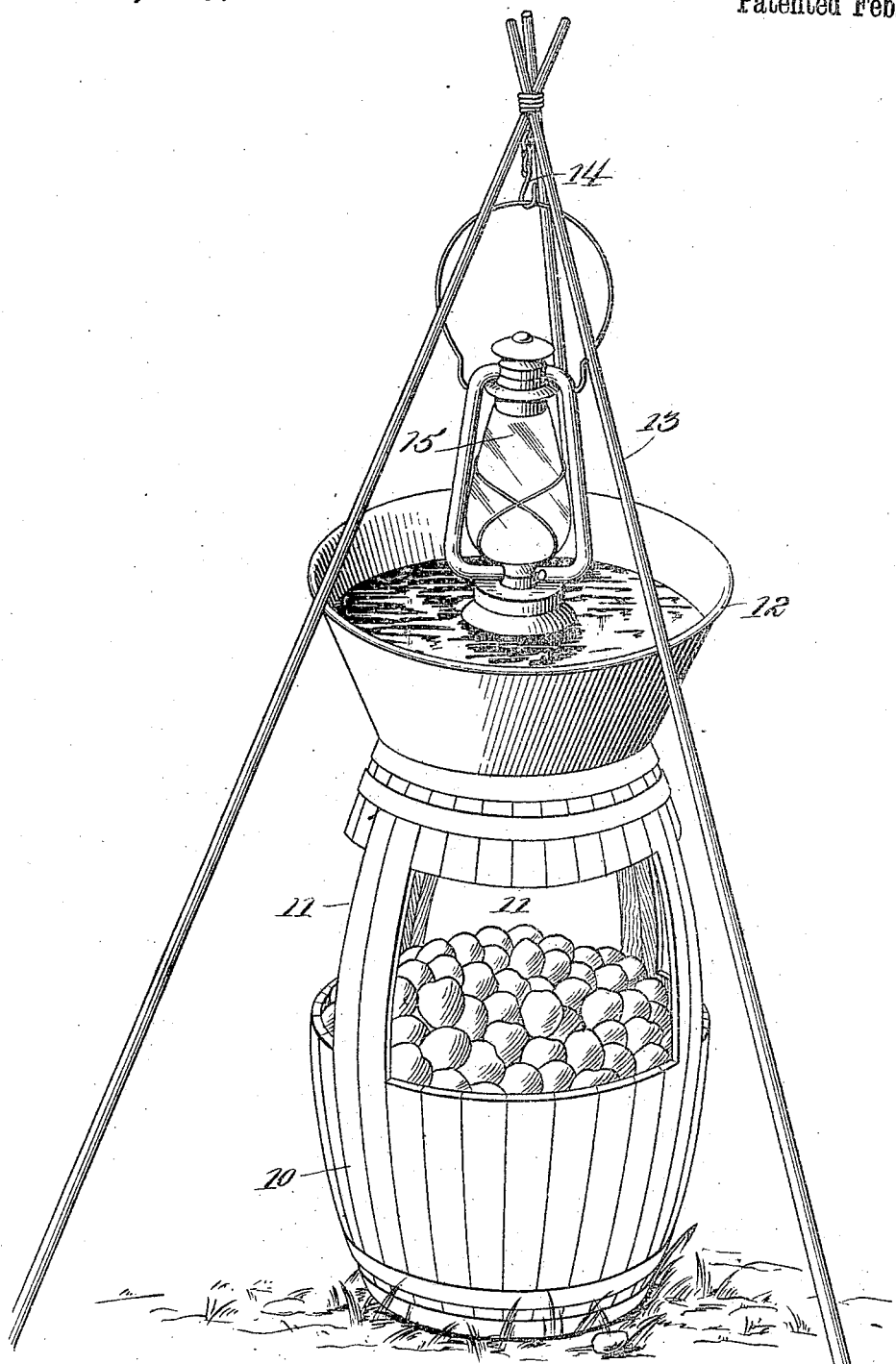

ALBERT H. LEE, OF CANBY, OREGON.

INSECT-CATCHER.

948,786.

Specification of Letters Patent. Patented Feb. 8, 1910.

Application filed April 14, 1909. Serial No. 489,796.

*To all whom it may concern:*

Be it known that I, ALBERT H. LEE, a citizen of the United States, and a resident of Canby, in the county of Clackamas and State of Oregon, have invented a new and Improved Insect-Catcher, of which the following is a full, clear, and exact description.

This invention relates to certain improvements in insect catchers, and more particularly to that type in which a vessel or container containing a poisonous or insect-destroying liquid is placed in juxtaposition to some means for attracting the insects.

In my improved construction I employ a fruit, preferably in a partially decayed condition, as the bait, and utilize the container of poisonous or destroying liquid as the cover or top for the fruit container. In connection with these containers, I preferably employ a light suspended with its lower portion adjacent the surface of the liquid, so as to attract the insects at night.

Reference is to be had to the accompanying drawing, forming a part of this specification, in which the figure shows a perspective view of a device constructed in accordance with my invention.

In the specific form illustrated, I employ a container for the fruit or other substance constituting the bait, and so construct the container that the insects may readily gain access thereto, and the odor of the bait may freely escape and be wafted in all directions by the wind. As a simple form of container, I may employ a barrel 10, having a series of openings 11 cut in the sides thereof, so that the barrel may be filled approximately half full of fruit, which constitutes the bait. The fruit employed is partially decayed and thus serves more effectively as a bait. Above the barrel 10 is placed a pan 12, which constitutes a cover for the barrel, and the barrel constitutes a support for the pan. The pan is partially filled with kerosene oil or any other suitable liquid which will kill or destroy insects falling therein. The liquid may contain a poison or may act on the insects in any other way to kill them. By the term "poisonous liquid" I wish to cover any liquid injurious to insect life. The bottom of the pan is illustrated as being substantially the same diameter as the head of the barrel, and the sides of the pan diverge outwardly so that the pan serves to prevent the admission of rain water to the barrel. Arranged about the barrel and pan is a tripod 13, having a depending hook 14 at the apex thereof, and suspended from this hook is a lantern 15 or any other suitable form of illuminating means. The lantern is so placed that the lower surface thereof comes closely adjacent the surface of the liquid, and it being directly over the center of the pan, the insects striking against the chimney or globe of the lantern and falling downwardly therefrom, will be caught in the liquid.

In my improved insect catcher, the light operates to attract the insects, as is well-known and understood. The light cannot be seen to any great distance in the daytime, and thus operates very ineffectually by itself to attract the insects. The light, of course, operates very well at night, but it is in the daytime that the most insects are flying about.

By means of my improved device, the odor of the fruit as it freely escapes from the container, may attract the insects from all directions, irrespective of the light, and after the insects come into close proximity to the container, the light is seen by them and they fly toward it only to become partially dazed and fall into the liquid below the light.

Having thus described my invention, I claim as new and desire to secure by Letters Patent:

An insect destroyer, comprising a barrel having a continuous circular band at the top thereof and having openings cut in the side to permit the insertion of fruit or other odoriferous material, a circular pan adapted to contain liquid and detachably placed upon the top of said barrel and constituting a cover for the same, a tripod supported upon the ground and disposed adjacent the barrel and the pan and having the legs thereof holding said pan against lateral displacement, and a light suspended from said tripod adjacent the surface of the pan.

In testimony whereof I have signed my name to this specification in the presence of two subscribing witnesses.

ALBERT H. LEE.

Witnesses:
  E. E. BRADTL,
  WILLIAM KNIGHT.